(No Model.) 2 Sheets—Sheet 1.
J. B. DUGUID.
MEANS FOR SWITCHING FROM MAIN TO SIDE TRACKS.
No. 515,823. Patented Mar. 6, 1894.
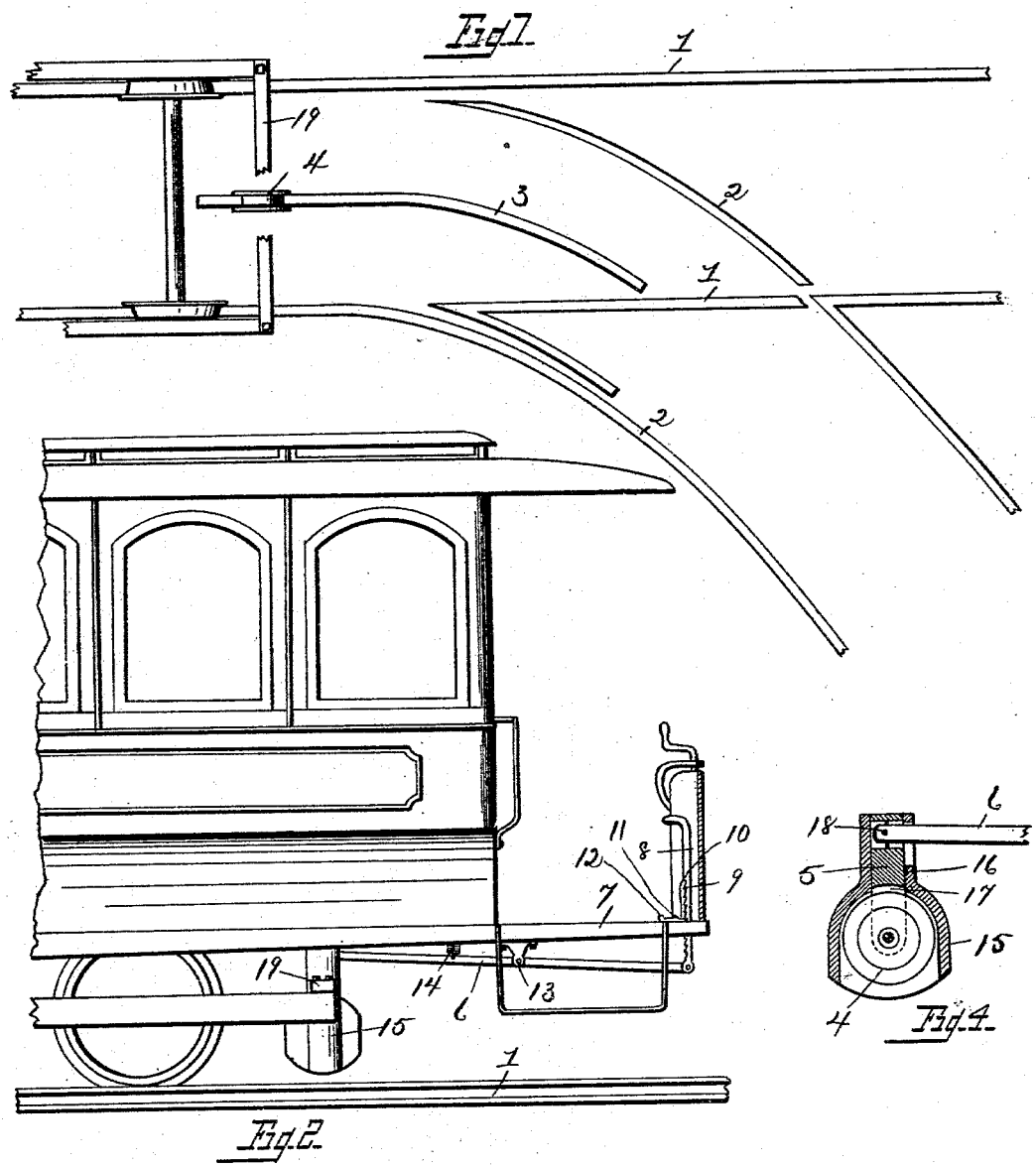
WITNESSES
Carroll J. Webster
Floyd R. Webster
INVENTOR
John B. Duguid
By William Webster
Atty (No Model.) 2 Sheets—Sheet 2.
J. B. DUGUID.
MEANS FOR SWITCHING FROM MAIN TO SIDE TRACKS.
No. 515,823. Patented Mar. 6, 1894.
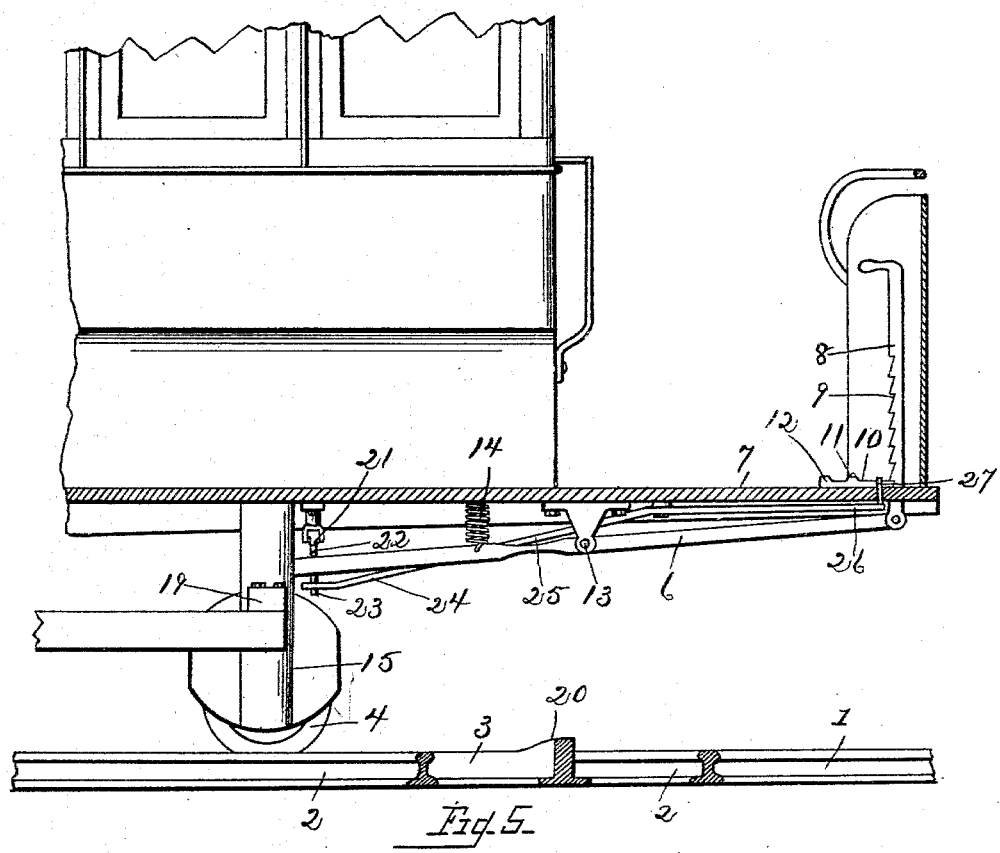
Fig. 5.
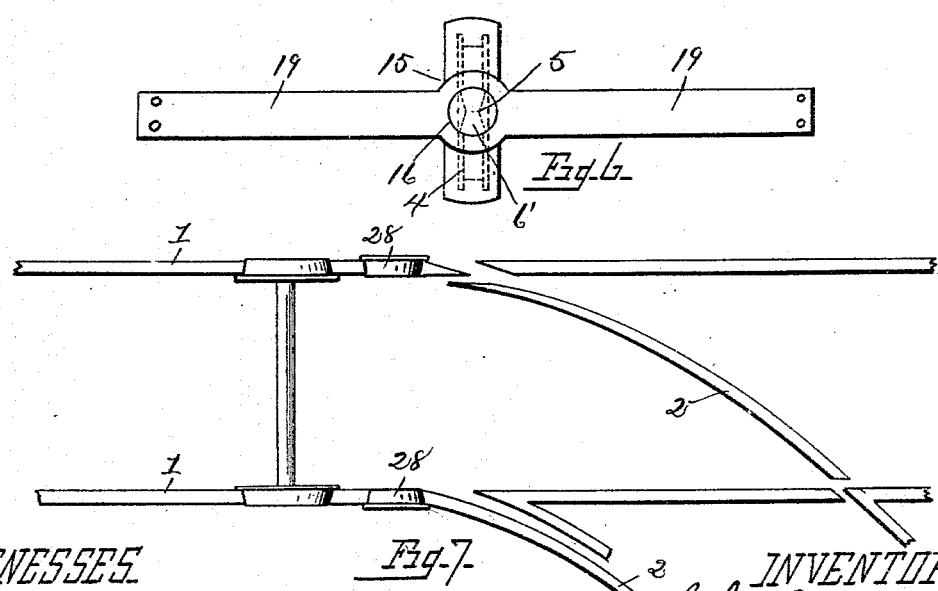
Fig. 6.
Fig. 7.
WITNESSES
Carroll J. Webster
Floyd R. Webster
INVENTOR
John B Duguid
By William Webster
Atty

UNITED STATES PATENT OFFICE.

JOHN B. DUGUID, OF TOLEDO, OHIO.

MEANS FOR SWITCHING FROM MAIN TO SIDE TRACKS.

SPECIFICATION forming part of Letters Patent No. 515,823, dated March 6, 1894.

Application filed May 15, 1893. Serial No. 474,173. (No model.)

*To all whom it may concern:*

Be it known that I, JOHN B. DUGUID, of Toledo, county of Lucas, and State of Ohio, have invented certain new and useful Improvements in Means for Switching from Main to Side Tracks; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to means for switching from main to side tracks, and has for its object to dispense with the usual movable switch point, and the mechanism necessary to operate the same by substituting therefor a guide wheel, which, when placed in contact with a guide rail will lead the car upon the switch.

A further object is to provide convenient means for controlling the guide wheel with automatic means for withdrawing the wheel from the guide rail.

The invention consists in the parts and combination of parts hereinafter described and pointed out in the claims.

In the drawings: Figure 1 is a plan view of main and side tracks arranged for co-operation with my system of switch showing the guide tracks for co-action with the guide-wheels. Fig. 2 is a side elevation of a section of car, showing the guide wheel, guide, and lever mechanism for controlling the guide wheel. Fig. 3 is a front elevation of the guide wheel, guide, and transverse bar for sustaining the same upon the car body. Fig. 4 is a transverse sectional view of the same showing the guide wheel within the guide. Fig. 5 is a side elevation of a section of car, showing the guide wheel lowered upon the guide rail, also the upward curve of the guide rail at the end extending to the switch rails, and an automatic trip for allowing the guide wheel to rise from contact with the guide rail. Fig. 6 is a top plan view of the guide wheel, guide, and transverse bar. Fig. 7 is a plan view of a main and switch rail with a modified form of guide wheels.

1 designates the main tracks. 2 the switch or branch tracks, which may be provided with the usual frog, or merely an opening for the flange of the wheels.

3 designates a guide rail having a curvature of the switch rails, located centrally of the main and switch tracks, and of a length to extend parallel with the main track a short distance and between the switch rails sufficiently far to lead the car thereon.

Centrally of the width of the car in front of the forward wheels is arranged a guide wheel 4, which may be flanged upon both sides if the switch tracks upon both sides of the switch tracks along the line diverge in opposite directions, if not, but one flange is needed. I prefer to flange both sides of the wheel as it causes the wheel to run more steadily. Wheel 4 is journaled in hanger 5 to which one end of a lever 6 is attached, the opposite end of the lever extending to the front end of the platform 7 of the car, and connected with a hand bar 8, which extends to within convenient reach of the driver or motorman, and is ratcheted at 9 to receive a catch 10 pivoted at 11 upon the car platform, and having a rearwardly extending end 12 to allow of moving the same by pressure of the foot. Lever 6 is fulcrumed upon the under side of the car at 13, so that raising upon bar 8, the wheel is lowered upon the guide rail and a spring 14 is interposed between the car platform and lever in rear of fulcrum 13, which normally raises the rear end of the lever and raises the wheel from the guide rail 3 when catch 10 is moved from engagement with the ratchet face of lever 8.

In order to firmly guide the wheel upon the guide rail, and afford the necessary rigidity to prevent lateral swaying of the wheel under the force exerted in guiding the car upon the switch rails, the hanger and wheel move in a guide or housing 15, formed with a tubular bearing 16 into which the hangers closely fit, and of a length to guide the hanger in its vertical movement, and in order to afford a bearing along the entire length the tubular bearing is slotted vertically as at 17 to receive the end of lever 6, the length of the slot permitting the free movement of the lever to its full throw. The housing below the tubular portion has an interior chamber of a size and contour to closely house and support the wheel, when in engagement with the guide rail. Lever 6 is connected with the hanger by passing the end through a slot 6' shown in dotted lines, Fig. 6, and in order to allow of a slight rotative movement of the hanger to compensate for any variation between the curvature of the guide rail and main tracks, the wall of the slot is contracted at the center of the length, or at the point where the bolt or pivot 18 passes through the lever as is also shown in Fig. 4.

The guide or housing 15 is either formed integral with, or firmly secured to a bar 19 which is secured to the forward portion of the truck, and firmly sustains the guide in place.

In order to automatically release catch 10 from the ratchet 9, when lever 8 has been raised to depress the guide wheel to the guide rail, the end of the guide rail is formed with a slight upward curve 20, which when the guide wheel has ridden up, causes lever 6 to contact with one end 21 of a bell crank lever 22 suspended from the bottom of the car and causes the opposite end 23 of lever 22 to contact with one end 24 of a bar 25 pivoted centrally of its length beneath the car, and the opposite end 26 of the bar to move in an opposite direction, cause a pin 27 to contact with catch 10 and push the catch from engagement with the ratchet of bar 8, when spring 14 will raise the wheel from the guide rail. The central guide wheel is thrown down upon reaching the guide rail, and rests thereon with the effect of gradually drawing the wheels of the car toward the switch rails. As soon as the car wheels have been given the slightest inclination toward the switch, the tendency increases in this direction, and but a minimum power is exerted by the guide wheel to effect the desired result.

In Fig. 7 I have shown a modified form of arrangement for carrying out my invention, in which the central guide rail is omitted and two flanged wheels 28 are employed, the flanges being in inverse order to the flange of the car wheels, the operation of raising and lowering being identical and the effect the same as with the central wheel.

It will be apparent that I may vary the construction without departing from the spirit of my invention. As an illustration, the standard may be rectangular in cross section, and run in a rectangular guide in order to lend rigidity and prevent swaying under strain.

What I claim is—

1. In combination, a car carrying a wheel guide, the standard movable therein and carrying a wheel, the lever for operating the standard, the bar for operating the lever, the catch for holding the same, and a spring for returning it, and a guide upon the track for co-action with the wheel.

2. In combination, a car carrying a wheel guide, the standard movable therein and carrying a wheel, the lever for operating the standard, said lever working in a slot in the guide, the bar for operating the lever, the catch for holding the same, and a spring for returning it, and a guide upon the track for co-action with the wheel.

3. In combination, a car carrying a wheel guide, the wheel and standard, the lever and operating bar, and the catch for holding said bar, the elbow levers, and the lever pivoted to the bottom of the car and carrying a pin adapted to engage the catch and release the same and the main and guide rails having a raised portion for the purpose of releasing the catch.

4. In a railway switch, the main rails, the switch rails, a central rail of the same curvature as the main and switch rails at their point of joinder, a car, a guide upon the car, a wheel supported in the guide, a lever for lowering the wheel upon the track and automatic mechanism for raising the wheel.

5. In a railway switch, a curved rail centrally of the main and switch rails, a car, a wheel upon the car co-incident with the curved rail, a lever fulcrumed beneath the car connected at one end with the wheel, the opposite end with a ratcheted bar upon the car platform, a pawl for holding the wheel upon the track, a spring for raising the wheel, and mechanism for releasing the pawl to allow the spring to raise the wheel.

6. In a railway switch, a central rail, a wheel upon the car in co-incidence therewith, normally held in raised position, a lever connected with the wheel, connections upon the platform with the lever for lowering the wheel, and securing the same, and a trip lever for releasing the lever and raising the wheel.

In testimony that I claim the foregoing as my own I hereby affix my signature in presence of two witnesses.

JOHN B. DUGUID.

Witnesses:
F. R. WEBSTER,
WILLIAM WEBSTER.